United States Patent
Khan et al.

(10) Patent No.: US 12,411,261 B2
(45) Date of Patent: Sep. 9, 2025

(54) SELECTION OF SIMULATION MODELS USING FRACTURE INFORMATION

(71) Applicant: Chevron U.S.A. Inc., San Ramon, CA (US)

(72) Inventors: Shahzad Ali Khan, Katy, TX (US); Han Young Park, Katy, TX (US); Baosheng Liang, Houston, TX (US)

(73) Assignee: Chevron U.S.A. Inc., San Ramon, CA (US)

(*) Notice: Subject to any disclaimer, the term of this patent is extended or adjusted under 35 U.S.C. 154(b) by 1042 days.

(21) Appl. No.: 17/466,889

(22) Filed: Sep. 3, 2021

(65) Prior Publication Data
US 2023/0074500 A1 Mar. 9, 2023

(51) Int. Cl.
*G01V 20/00* (2024.01)
*E21B 43/26* (2006.01)
*G06F 30/20* (2020.01)
*G06F 111/20* (2020.01)

(52) U.S. Cl.
CPC .............. *G01V 20/00* (2024.01); *E21B 43/26* (2013.01); *G06F 30/20* (2020.01); *E21B 2200/20* (2020.05); *G06F 2111/20* (2020.01)

(58) Field of Classification Search
CPC ...... G06F 30/00; G06F 30/20; G06F 2111/20; G01V 20/00; G01V 2210/1234; G01V 2210/646; E21B 43/26; E21B 2200/20
USPC ....................................................... 703/10, 6
See application file for complete search history.

(56) References Cited

U.S. PATENT DOCUMENTS

| | | | |
|---|---|---|---|
| 11,842,127 B2 * | 12/2023 | AlQahtani | G06F 30/20 |
| 2020/0032623 A1 * | 1/2020 | McClure | G06F 30/28 |
| 2021/0102461 A1 * | 4/2021 | Kumar | E21B 44/02 |

OTHER PUBLICATIONS

Abdrakhmanova, Alzada et al., "Probabilistic History Matching of Dual-Porosity and Dual-Permeability Korolev Model Using Three Discrete Fracture Models", Oct. 27-29, 2014, SPE Annual Technical Conference and Exhibition, Society of Petroleum Engineers. (Year: 2014).*
Wantawin et al. "An Iterative Response-Surface Methodology by Use of High-Degree-Polynomial Proxy Models for Integrated History Matching and Probabilistic Forecasting Applied to Shale-Gas Reservoirs", Dec. 2017; SPE Journal. (20 Pages).
Jones et al. "Use of Probabilistic Methods to Assess a Portfolio of Conventional and Unconventional Resources" Jun. 22, 2021; (13 Pages).
Cao et al. "Co-Development of Multiple Targets in Permian Unconventional Reservoirs" Jun. 2, 2021 (15 Pages).

* cited by examiner

*Primary Examiner* — Cedric Johnson
(74) *Attorney, Agent, or Firm* — Esplin & Associates, PC

(57) ABSTRACT

Characteristics of a reservoir may be used to generate multiple models of the reservoir with hydraulic fractures. Simulated configurations of the hydraulic fractures in the models may be used to select one or more of the models as representative model(s) for the reservoir. The representative model(s) may be used in development of the reservoir. Hydraulic fracturing may increase productivity at shale and tight rock reservoir by creating more effective flow paths to production.

20 Claims, 6 Drawing Sheets

|    | PKS | YM | RP | SK | IXSP |
|----|-----|----|----|----|------|
| 1  | 0   | 0  | 0  | 0  | 0    |
| 2  | -1  | 0  | 0  | 0  | 0    |
| 3  | 0   | -1 | 0  | 0  | 0    |
| 4  | 0   | 0  | -1 | 0  | 0    |
| 5  | 0   | 0  | 0  | -1 | 0    |
| 6  | 0   | 0  | 0  | 0  | -1   |
| 7  | 1   | 0  | 0  | 0  | 0    |
| 8  | 0   | 1  | 0  | 0  | 0    |
| 9  | 0   | 0  | 1  | 0  | 0    |
| 10 | 0   | 0  | 0  | 1  | 0    |
| 11 | 0   | 0  | 0  | 0  | 1    |
| 12 | 1   | -1 | -1 | -1 | -1   |
| 13 | 1   | 1  | -1 | -1 | 1    |
| 14 | 1   | 1  | 1  | -1 | -1   |
| 15 | 1   | 1  | 1  | 1  | -1   |
| 16 | 1   | -1 | 1  | 1  | -1   |
| 17 | -1  | 1  | -1 | 1  | -1   |
| 18 | -1  | -1 | 1  | -1 | 1    |
| 19 | -1  | -1 | -1 | -1 | 1    |
| 20 | -1  | 1  | -1 | -1 | -1   |
| 21 | -1  | -1 | 1  | 1  | 1    |
| 22 | -1  | -1 | -1 | 1  | 1    |
| 23 | 1   | 1  | 1  | -1 | 1    |
| 24 | 1   | 1  | -1 | -1 | -1   |
| 25 | 1   | -1 | 1  | 1  | 1    |
| 26 | 1   | 1  | 1  | 1  | -1   |
| 27 | 1   | 1  | 1  | 1  | 1    |

FIG. 3

SELECTION OF SIMULATION MODELS USING FRACTURE INFORMATION

FIELD

The present disclosure relates generally to the field of selecting simulation models.

BACKGROUND

Simulation models for a reservoir may be used to develop field development plans for the reservoir. Selection of representative reservoir models through conventional probabilistic design of experiment workflow, integrating with flow simulation, may be time consuming and costly.

SUMMARY

This disclosure relates to selecting simulation models. Reservoir characteristic information and/or other information may be obtained. The reservoir characteristic information may define characteristics of a reservoir. Ranges of the characteristics of the reservoir to be used in generating hydraulic fracture models of the reservoir may be determined. The hydraulic fracture models of the reservoir may be generated based on the ranges of the characteristics of the reservoir and/or other information. The hydraulic fracture models may define simulated configurations of one or more hydraulic fractures in the reservoir. A set of the hydraulic fracture models may be selected as a set of representative models for the reservoir. Use of the set of representative models for the reservoir in reservoir development may be facilitated.

A system for selecting simulation models may include one or more electronic storage, one or more processors and/or other components. The electronic storage may store reservoir characteristic information, information relating to a reservoir, information relating to characteristics of a reservoir, information relating to hydraulic fracture models, information relating to hydraulic fractures, information relating to representative models for a reservoir, information relating to field development, and/or other information.

The processor(s) may be configured by machine-readable instructions. Executing the machine-readable instructions may cause the processor(s) to facilitate selecting simulation models. The machine-readable instructions may include one or more computer program components. The computer program components may include one or more of a reservoir component, a range component, a model component, a selection component, a reservoir development component, and/or other computer program components.

The reservoir component may be configured to obtain reservoir characteristic information and/or other information. The reservoir characteristic information may define characteristics of a reservoir. In some implementations, the reservoir characteristic information may be obtained based on significance of individual characteristics of the reservoir on generation of the hydraulic fracture models and/or other information.

The range component may be configured to determine ranges of the characteristics of the reservoir to be used in generating hydraulic fracture models of the reservoir.

The model component may be configured to generate the hydraulic fracture models of the reservoir. The hydraulic fracture models of the reservoir may be generated based on the ranges of the characteristics of the reservoir and/or other information. The hydraulic fracture models may define simulated configurations of one or more hydraulic fractures in the reservoir. In some implementations, the simulated configurations of the hydraulic fracture(s) may include fracture length, fracture height, fracture volume, fracture surface area, and/or fracture conductivity.

In some implementations, generation of the hydraulic fracture models of the reservoir based on the ranges of the characteristics of the reservoir may include generation of the hydraulic fracture models of the reservoir based on combinations of different values of the characteristics of the reservoir, with the different values of the characteristics of the reservoir falling within the ranges of the characteristics of the reservoir.

The selection component may be configured to select a set of the hydraulic fracture models as a set of representative models for the reservoir. In some implementations, the set of the hydraulic fracture models may be selected as the set of representative models for the reservoir based on the simulated configurations of the hydraulic fracture(s) in the reservoir defined by the hydraulic fracture models and/or other information.

In some implementations, the set of representative models for the reservoir may include a high yield model, a medium yield model, a low yield model, and/or other yield model. In some implementations, the high yield model may include a P90 model, the medium yield model may include a P50 model, and a low yield model may include a P10 model.

The reservoir development component may be configured to facilitate use of the set of representative models for the reservoir in reservoir development. In some implementations, the reservoir development may include determination of number and placement of wells in the reservoir. In some implementations, the reservoir development may include determination of one or more well designs for one or more wells in the reservoir. In some implementations, the reservoir development may include estimation of hydrocarbon recovery from the reservoir.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

BRIEF DESCRIPTION OF THE DRAWINGS

FIG. 3 illustrates example ranges of reservoir characteristics used to generate hydraulic fracture models.

DETAILED DESCRIPTION

The present disclosure relates to selecting simulation models. Characteristics of a reservoir may be used to generate multiple models of the reservoir with hydraulic fractures. Simulated configurations of the hydraulic fractures in the models may be used to select one or more of the models as representative model(s) for the reservoir. The representative model(s) may be used in development of the reservoir. Hydraulic fracturing may increase productivity at shale and tight rock reservoir by creating more effective flow paths to production.

Figure 1:
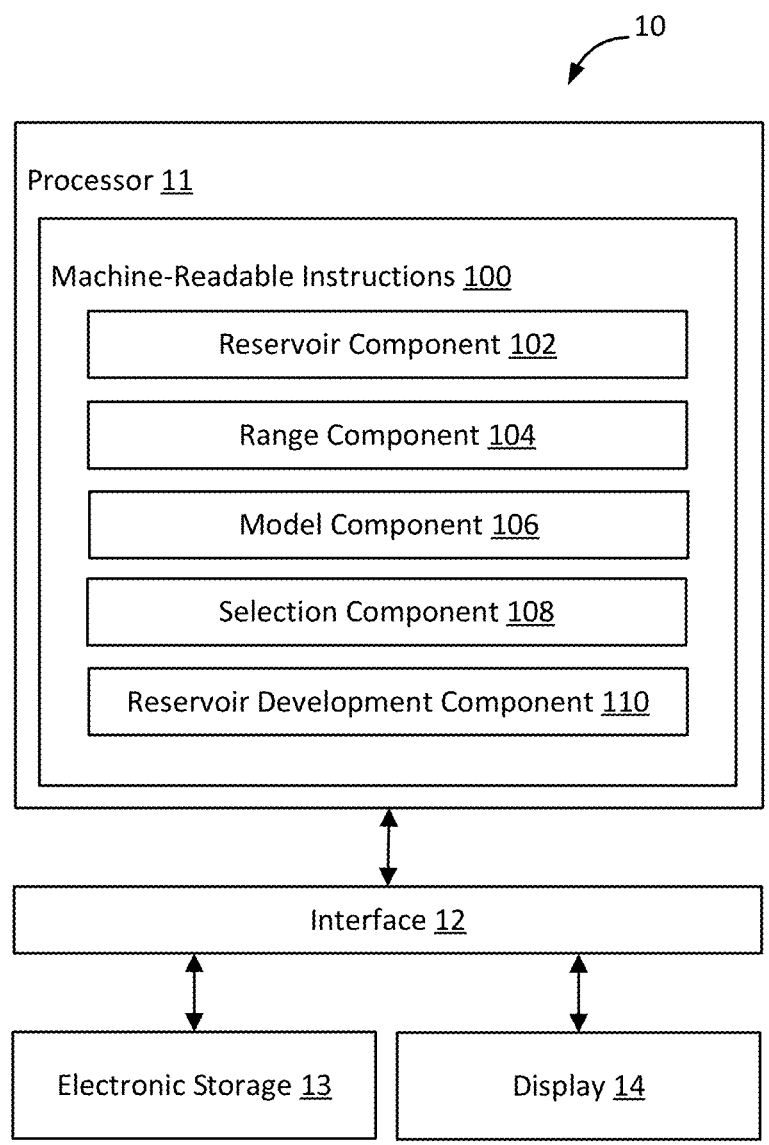
FIG. 1 illustrates an example system for selecting simulation models.

The methods and systems of the present disclosure may be implemented by a system and/or in a system, such as a system 10 shown in FIG. 1. The system 10 may include one or more of a processor 11, an interface 12 (e.g., bus, wireless interface), an electronic storage 13, a display 14, and/or other components. Reservoir characteristic information and/or other information may be obtained by the processor 11. The reservoir characteristic information may define characteristics of a reservoir. Ranges of the characteristics of the reservoir to be used in generating hydraulic fracture models of the reservoir may be determined by the processor 11. The hydraulic fracture models of the reservoir may be generated by the processor 11 based on the ranges of the characteristics of the reservoir and/or other information. The hydraulic fracture models may define simulated configurations of one or more hydraulic fractures in the reservoir. A set of the hydraulic fracture models may be selected by the processor 11 as a set of representative models for the reservoir. Use of the set of representative models for the reservoir in reservoir development may be facilitated by the processor 11.

The electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store reservoir characteristic information, information relating to a reservoir, information relating to characteristics of a reservoir, information relating to hydraulic fracture models, information relating to hydraulic fractures, information relating to representative models for a reservoir, information relating to field development, and/or other information.

The display 14 may refer to an electronic device that provides visual presentation of information. The display 14 may include a color display and/or a non-color display. The display 14 may be configured to visually present information. The display 14 may present information using/within one or more graphical user interfaces. For example, the display 14 may present information relating to a reservoir, information relating to reservoir characteristics, information relating to hydraulic fracture models, information relating to representative models for a reservoir, information relating to reservoir development, and/or other information.

Hydraulic fracturing may increase productivity at an unconventional reservoir (e.g., shale and tight rock reservoir) by creating more effective flow paths to production. Understanding sensitivity of reservoir characteristics to hydraulic fractures and capturing its uncertainty in representative models may be important in developing plans for the reservoir and/or use of the reservoir.

Hydraulic fractures in an unconventional reservoir may be simulated in a reservoir model. Fluid flow simulations for the unconventional reservoir may be performed to study how fluid moves through the simulated hydraulic fractures in the reservoir model and determine production of hydrocarbon from the reservoir model. Fluid flow simulations for different reservoir models (containing different hydraulic fracture simulations) may be used to identify models that are representative of the reservoir. Fluid flow simulations, however, require extensive efforts and computation time. The amount of effort and computation time required to perform individual fluid flow simulations makes performance of these simulations for every reservoir model not practical.

The current disclosure utilizes correlation between hydraulic fracture configuration and hydrocarbon recovery to make selection of representative reservoir models more efficiently. Rather than performing fluid flow simulations to determine which models are representative of a reservoir, configurations of hydraulic fracture within the models may be used to determine which models are representative of the reservoir. Uncertainties of the reservoir may be captured by generating a variety of models using different values of reservoir characteristics. Different models may include different configurations of simulated hydraulic fractures, these configurations of the simulated hydraulic fractures may be used to select the representative models (e.g., low, middle, and high models; P10, P50, and P90 models). Such selection of representative models may be faster than traditional selection of models using fluid flow simulations because fluid flow simulations are not required to select the models. Such selection of representative models is reliable, efficient, and more flexible and time efficient than traditional selection of models using fluid flow simulations because it allows for use and calibration of hydraulic fracture configurations to select the models. Representative models selected using the hydraulic fracture configuration may capture both the heterogeneity and uncertainties in the reservoir.

Referring back to FIG. 1, the processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate selecting simulation models. The machine-readable instructions 100 may include one or more computer program components. The machine-readable instructions 100 may include a reservoir component 102, a range component 104, a model component 106, a selection component 108, a reservoir development component 110, and/or other computer program components.

The reservoir component 102 may be configured to obtain reservoir characteristic information and/or other information. Obtaining reservoir characteristic information may include one or more of accessing, acquiring, analyzing, determining, examining, identifying, loading, locating, opening, receiving, retrieving, reviewing, selecting, storing, and/or otherwise obtaining the reservoir characteristic information. The reservoir component 102 may obtain reservoir characteristic information from one or more locations. For example, the reservoir component 102 may obtain reservoir characteristic information from a storage location, such as the electronic storage 13, electronic storage of a device accessible via a network, and/or other locations. The reservoir component 102 may obtain reservoir characteristic information from one or more hardware components (e.g., a computing device) and/or one or more software components (e.g., software running on a computing device). In some implementations, the reservoir characteristic information may be obtained from one or more users. For example, a user may interact with a computing device to input the reservoir characteristic information (e.g., identify which reservoir characteristics will be used, enter values of reservoir characteristics).

The reservoir characteristic information may define characteristics of a reservoir. A reservoir may refer to a location at which one or more resources are stored. For example, a reservoir may refer to a location at which hydrocarbon are stored. For instance, a reservoir may refer to a location including rocks in which oil and/or natural gas have accumulated. A reservoir may include regions above the surface, at the surface, and/or below the surface. For example, a reservoir may include one or more subsurface regions. A subsurface region may refer to a part of earth located beneath the surface/located underground. A subsurface region may refer to a part of earth that is not exposed at the surface of the ground. A reservoir may include one or more wells. For example, a reservoir may include one or more injection wells (e.g., for injection of fluid), one or more production wells (e.g., for extraction of oil or gas), and/or other wells. A reservoir may refer to a location in which hydraulic fractures may be required to extract the stored resources, such as an unconventional reservoir (e.g., tight-gas sands, gas and oil shales).

Characteristics of a reservoir may refer to attribute, quality, configuration, parameter, and/or characteristics of matter within the reservoir (e.g., above the surface, at the surface, below the surface). Characteristics of the reservoir may refer to environmental characteristics, such as physical arrangement, composition, properties, and/or characteristics of materials (e.g., subsurface elements) within the reservoir. Characteristics of the reservoir may refer to design characteristics, such as information relating to design of one or more wells (e.g., well spacing, well location) within the reservoir. Characteristics of the reservoir may refer operational characteristics, such as to information relating to operation of one or more wells in the reservoir (e.g., operating characteristics of well(s) in the reservoir). Other characteristics of the reservoir are contemplated.

In some implementations, the characteristics of the reservoir may include petrophysical properties of the reservoir, the geo-mechanical properties of the reservoir, and/or other properties of the reservoir. For example, petrophysical properties of the reservoir may include permeability, porosity, saturation, reservoir pressure and/or other petrophysical properties, and geo-mechanical properties of the reservoir may include Young's modulus, Poisson ratio, stress, fracture toughness, and/or other geo-mechanical properties.

In some implementations, the characteristics of the reservoir may include static characteristics, dynamic characteristics, and/or other characteristics of the reservoir. Static characteristics of the reservoir may refer to characteristics of the reservoir that may not change (e.g., with time). Dynamic characteristics of the reservoir may refer to characteristics of the reservoir that may change (e.g., with time). For example, static characteristics of the reservoir may include permeability, porosity, Young's modulus, Poisson ratio, friction coefficient, rock type, and/or other static characteristics, and dynamic characteristics of the reservoir may include saturation, pressure, horizontal stress and/or other dynamic characteristics. In addition, during hydraulic fracturing operations, there may be some decision variables, such as stage length, cluster spacing, perforation density, fluid intensity, proppant intensity, and/or other decision variables.

In some implementations, the characteristics of the reservoir may include natural fracture parameters. Natural fracture parameters may refer to numerical measure of one or more fracture characteristics. For example, natural fracture parameters may include fracture length, fracture orientation, fracture spacing, and/or other natural fracture parameters.

The reservoir characteristic information may define characteristics of the reservoir by including information that describes, delineates, defines, identifies, is associated with, quantifies, reflects, sets forth, and/or otherwise defines one or more of value, property, quality, quantity, attribute, feature, and/or other aspects of the characteristics within the reservoir. The reservoir characteristic information may directly and/or indirectly define the characteristics of the reservoir. For example, the reservoir characteristic information may define characteristics of the reservoir by including information that identifies and/or specifies value of specific characteristics of the reservoir and/or information that may be used to determine the identity and/or the value of the specific characteristics of the reservoir. Other types of reservoir characteristic information are contemplated.

In some implementations, the reservoir characteristic information may be obtained based on significance of individual characteristics of the reservoir on generation of hydraulic fracture models of the reservoir and/or other information. That is, information on specific reservoir characteristics may be obtained on the significance of those specific reservoir characteristics on generation of the hydraulic fracture models. Significance of a reservoir characteristic on generation of the hydraulic fracture models may refer to the importance of the reservoir characteristic on generation of the hydraulic fracture models, such as how much impact the reservoir characteristic has on the generation of the hydraulic fracture models and/or the sensitivity of the reservoir characteristic on the generation of the hydraulic fracture models. For example, the reservoir characteristics that may have the most impact/may be most sensitive on the generation of the hydraulic fracture models may be obtained.

The range component 104 may be configured to determine ranges of the characteristics of the reservoir to be used in generating hydraulic fracture models of the reservoir. To capture uncertainties in the reservoir, such as dynamic uncertainties (e.g., connectivity, productivity) and reservoir property uncertainties, the values of the reservoir characteristics used in generating hydraulic fracture models of the reservoir may be varied. The range component 104 may determine the ranges of reservoir characteristic values to be used in generating hydraulic fracture models of the reservoir. The range component 104 may determine how the values of the reservoir characteristic will be varied for the generation of the hydraulic fracture models. Varying the reservoir characteristic values may result in the hydraulic fracture models of the reservoir capturing the uncertainty in the reservoir.

Determining ranges of the characteristics of the reservoir to be used in generating hydraulic fracture models of the reservoir may include ascertaining, approximating, calculating, establishing, estimating, finding, identifying, obtaining, quantifying, selecting, setting, and/or otherwise determining the ranges of the characteristics of the reservoir. In some implementation, determining a range of a reservoir characteristic may include determining the minimum and the maximum value of the reservoir characteristic to be used. In some implementations, determining a range of a reservoir characteristic may further include determining the increment by which the values of the reservoir characteristic will be varied within the range.

The ranges of the characteristics of the reservoir to be used in generating hydraulic fracture models of the reservoir may be determined manually and/or automatically. For example, a particular range of reservoir characteristic values may be manually selected by a user. As another example, a particular range of reservoir characteristic values may be automatically selected by the range component 104 based on defaults, the type of reservoir characteristic, the type of reservoir, and/or other information. Other determinations of the ranges of the characteristics of the reservoir are contemplated.

FIG. 3 illustrates example ranges of reservoir characteristics used to generate hydraulic fracture models. In FIG. 3, five different reservoir characteristics (porosity-permeability-saturation, Young's Modulus, reservoir pressure, clay, stress) may range between values of minus one and one ($-1$=low; $0$=middle; $1$=high). Varying these characteristics with these ranges may result in twenty-seven different unique combination of reservoir characteristic values. Other ranges of reservoir characteristics are contemplated.

The model component 106 may be configured to generate the hydraulic fracture models of the reservoir. A hydraulic fracture model of a reservoir may refer a computer simulation of hydraulic fractures in the reservoir. A hydraulic fracture model of a reservoir may refer to a model of the reservoir that includes simulated hydraulic fractures. A hydraulic fracture may refer to a fracture located underground. A hydraulic fracture may refer to a fracture created through hydraulic fracturing. A fracture may refer to separation in a geologic formation. For example, a fracture may refer to a crack or a breakage within rock. A fracture may provide permeability for fluid movement, such as for water or hydrocarbons. A fracture may be used to increase recovery of hydrocarbons buried underground. In some implementations, the model component 106 may be configured to generate other fracture models of the reservoir (that define simulated configurations of other fractures in the reservoir). That is, the model component 106 may simulate other types of fractures located underground.

The hydraulic fracture models of the reservoir (and/or other fracture models of the reservoir) may be generated based on the ranges of the characteristics of the reservoir and/or other information. Multiple/different hydraulic fracture models of the reservoir may be generated by varying the reservoir characteristic values, with the reservoir characteristic values staying within the ranges determined by the range component 104. That is, the hydraulic fracture models of the reservoir may be generated based on combinations of different values of the characteristics of the reservoir, with the different values of the characteristics of the reservoir falling within the ranges of the characteristics of the reservoir. For example, referring to FIG. 3, twenty-seven different hydraulic fracture models of the reservoir may be generated based twenty-seven different combinations of reservoir characteristic values.

The hydraulic fracture models of the reservoir may define simulated configurations of one or more hydraulic fractures in the reservoir. The hydraulic fracture models of the reservoir may include simulations of one or more hydraulic fracture in the reservoir. Different hydraulic fracture models may include different simulations of the hydraulic fracture(s) in the reservoir. Use of different values of reservoir characteristics in generation of different hydraulic fracture models may result in different hydraulic fracture modeling including different simulated configurations of the hydraulic fracture(s) in the reservoir.

Simulated configuration of a hydraulic fracture may refer to configuration of a hydraulic fracture that is generated by a computer to imitate configuration of a real hydraulic fracture. Configuration of a hydraulic fracture may refer to arrangement, attribute, quality, type, and/or characteristics of the hydraulic fracture. For example, configuration of a hydraulic fracture may refer to the geometry of the hydraulic fracture and/or the properties of the hydraulic fracture. For instance, the configurations of the hydraulic fracture(s) simulated by the hydraulic fracture models may include one or more of fracture length, fracture height (e.g., maximum height, average height), fracture volume (e.g., total volume, leak-off volume), fracture surface area, fracture conductivity, fracture width (e.g., width at wellbore, average width), pressure (e.g., at wellbore), and/or fracture area by pay. Use of other configurations of the hydraulic fracture(s) are contemplated.

The selection component 108 may be configured to select a set of the hydraulic fracture models as a set of representative models for the reservoir. Selecting a set of the hydraulic fracture models as a set of representative models for the reservoir may include ascertaining, choosing, determining, establishing, finding, identifying, obtaining, and/or otherwise selecting the set of the hydraulic fracture models as the set of representative models for the reservoir. The selection component 108 may select some of the hydraulic fracture models generated by the model component 106 as being representative of the reservoir. For example, the selection component 108 may select one or more of the hydraulic fracture models generated by the model component 106 as being representative of the reservoir.

A representative model for a reservoir may refer to a computer simulation of the reservoir that is representative of one or more characteristics of the reservoir. A representative model for a reservoir may refer to a computer simulation of the reservoir that serves as a typical or a characteristic example of the reservoir. The set of the hydraulic fracture models may be selected as the set of representative models for the reservoir based on the simulated configurations of the hydraulic fracture(s) defined by the hydraulic fracture models and/or other information. That is, rather than performing fluid flow simulations to identify hydraulic fracture models that are/are not representative of the reservoir, the selection component 108 may use the simulated configurations of the hydraulic fracture(s) in the hydraulic fracture models to identify hydraulic fracture models that are/are not representative of the reservoir. Selection of representative models using the simulated configurations of the hydraulic fracture(s) may be faster and more flexible than selection of representative models using fluid flow simulation. Use of simulated configurations of the hydraulic fracture(s) to select representative models may result in significant computation time savings while maintaining the range of hydraulic fracture heterogeneity. The hydraulic fracture models selected as being representative of the reservoir may capture the uncertainties (e.g., static and dynamic uncertainties) in the reservoir.

In some implementations, the selection component 108 may use particular types of simulated configurations of hydraulic fracture(s) based on their significance on hydrocarbon recovery from the reservoir and/or other information. The selection component 108 may select particular type of simulated configurations of hydraulic fracture(s) for use in identifying representative models based on importance of the particular type of simulated configurations on predicted hydrocarbon recovery, such as how much impact the particular type of simulated configurations has on predicted hydrocarbon recovery and/or the sensitive of the particular type of simulated configurations on the predicted hydrocarbon recovery. For example, fracture length, fracture height, fracture volume, fracture surface area, or fracture conductivity simulated by the hydraulic fracture models may be more significant than other simulated configurations of hydraulic fracture(s) on prediction of hydrocarbon recovery, and the selection component 108 may use these types of simulated configurations of hydraulic fracture(s) to select the representative models. Use of particular types of simulated configurations of hydraulic fracture(s) may include use of the particular types and exclusion of other types of simulated configurations, giving more weight to the particular types than other types of simulated configuration, and/or other use of the particular types of simulated configurations of hydraulic fracture(s).

In some implementations, the set of representative models for the reservoir may include a high yield model, a medium yield model, a low yield model, and/or other yield model. That is, the selection component 108 may select different hydraulic fracture models to be a high yield model, a medium yield model, a low yield model for the reservoir. A high yield model may refer to a model of the reservoir that provides high hydrocarbon recovery (e.g., optimistic hydrocarbon recovery scenario). A hydraulic fracture model may be selected as a high yield model based on values of the simulated hydraulic fracture configurations corresponding to high hydrocarbon recovery. A middle yield model may refer to a model of the reservoir that provides middle hydrocarbon recovery (e.g., average hydrocarbon recovery scenario). A hydraulic fracture model may be selected as a middle yield model based on values of the simulated hydraulic fracture configurations corresponding to middle hydrocarbon recovery. A low yield model may refer to a model of the reservoir that provides low hydrocarbon recovery (e.g., conservative/pessimistic hydrocarbon recovery scenario). A hydraulic fracture model may be selected as a low yield model based on values of the simulated hydraulic fracture configurations corresponding to low hydrocarbon recovery.

In some implementations, the high yield model may include a P90 model (cumulative P90), the medium yield model may include a P50 model (cumulative P50), and a low yield model may include a P10 model (cumulative P10). In some implementations, the P90, P50, and P10 models may provide approximately 90th percentile, 50th percentile, and 10th percentile hydrocarbon recovery. Selection of other types of representative models are contemplated.

Figure 4:
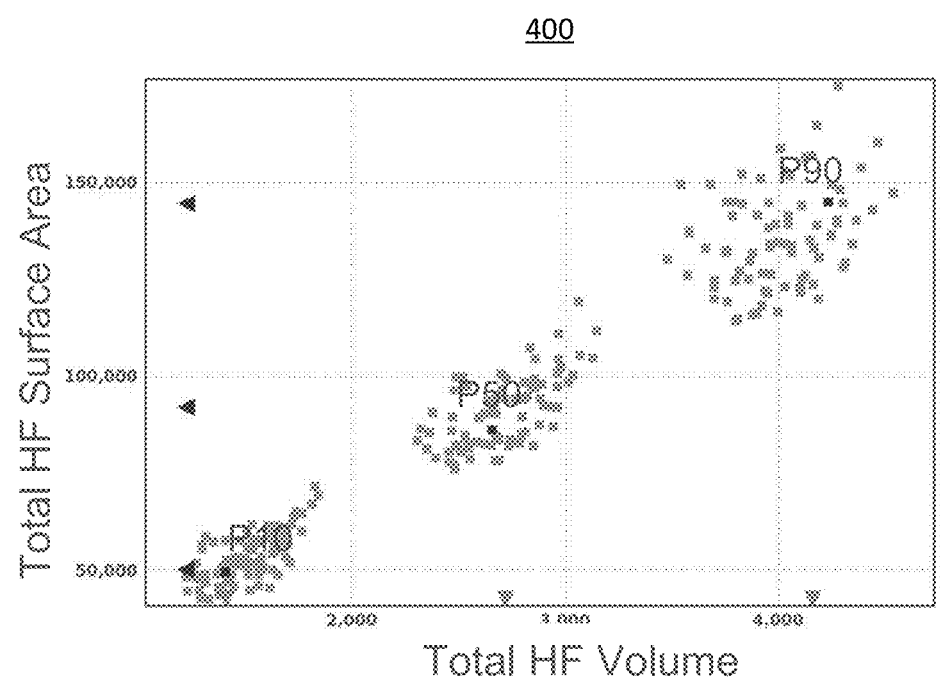
FIG. 4 illustrates an example selection of representative models.

FIG. 4 illustrates an example selection of representative models. FIG. 4 may show a distribution 400 of individual hydraulic fracture models (shown as individual dots). The hydraulic fracture models may be distributed based on the simulated configurations of hydraulic fracture(s), such as the surface area and the volume of the simulated hydraulic fracture(s). While FIG. 4 shows the distribution of hydraulic fracture models using two types of simulated configurations, this is merely as an example and is not meant to be limiting. More than two types of simulated configurations of hydraulic fracture(s) may be used to select the representative models.

The distribution of hydraulic fracture models for different hydraulic fracture configurations may be used to select the representative models. For example, to select a P90 model, the P90 values of (1) hydraulic fracture surface area and (2) hydraulic fracture volume in the hydraulic fracture models may be identified, and a hydraulic fracture model that satisfies these P90 values (has the same value as the P90 value, is within the threshold of the P90 value) may be selected as the P90 model. For instance, in FIG. 3, the hydraulic model that lands at/is closest to the intersection of the P90 values of (1) surface area and (2) volume may be selected as the P90 model. Other selections of representative models are contemplated.

The reservoir development component 110 may be configured to facilitate use of the set of representative models for the reservoir in reservoir development. Reservoir development may refer to act/process of developing a reservoir and/or planning how the reservoir will be developed. For example, reservoir development may include actual usage of the reservoir for hydrocarbon recovery (e.g., drilling of well(s), completion of well(s), production from well(s)) and/or planning for how the reservoir will be used for hydrocarbon recovery (e.g., designing well(s), generating roadmap(s) for operation of well(s)). For instance, reservoir development may include determination of number and/or placement of wells in the reservoir (e.g., well spacing, well landing), determination of one or more well designs (e.g., completion design) for one or more wells in the reservoir, estimation of hydrocarbon recovery from the reservoir (e.g., calculating estimated ultimate recovery), and/or determination of other information about the use of the reservoir. In some implementations, set of representative models for the reservoir may be used to optimize the reservoir development (e.g., optimum development strategy of multiple formation benches, parent-child well spacing, vertical separation thickness of different landing benches, optimization of landing zone, optimization of well completion). Different types of representative models (e.g., high yield, middle yield, low yield) may be used to provide simulation of different scenarios of outcome (high yield scenario simulation, middle yield scenario simulation, low yield scenario simulation). The representative models may be used to simulate and/or analyze one or more aspects of hydrocarbon recovery from the reservoir (e.g., hydrocarbon recovery simulation/analysis, pressure depletion simulation/analysis, well interference simulation/analysis). Other use of the set of representative models are contemplated.

Facilitating the use of the set of representative models for the reservoir in reservoir development may include presentation of one or more of the representative models on a display, using one or more of the representative models to control the reservoir development, and/or other facilitation of the use of set of representative models for the reservoir. Facilitating the use of the set of representative models for the reservoir in reservoir development may include using one or more of the representative models as input into one or more tools/software for reservoir development. Facilitating the use of the set of representative models for the reservoir in reservoir development may include using one or more of the representative models to simulate development of the reservoir. For example, one or more of the representative models may be used to simulate different number and/or placement of wells in the reservoir, simulate use of different well designs, and/or simulate recovery of hydrocarbon from the reservoir.

Figure 5:
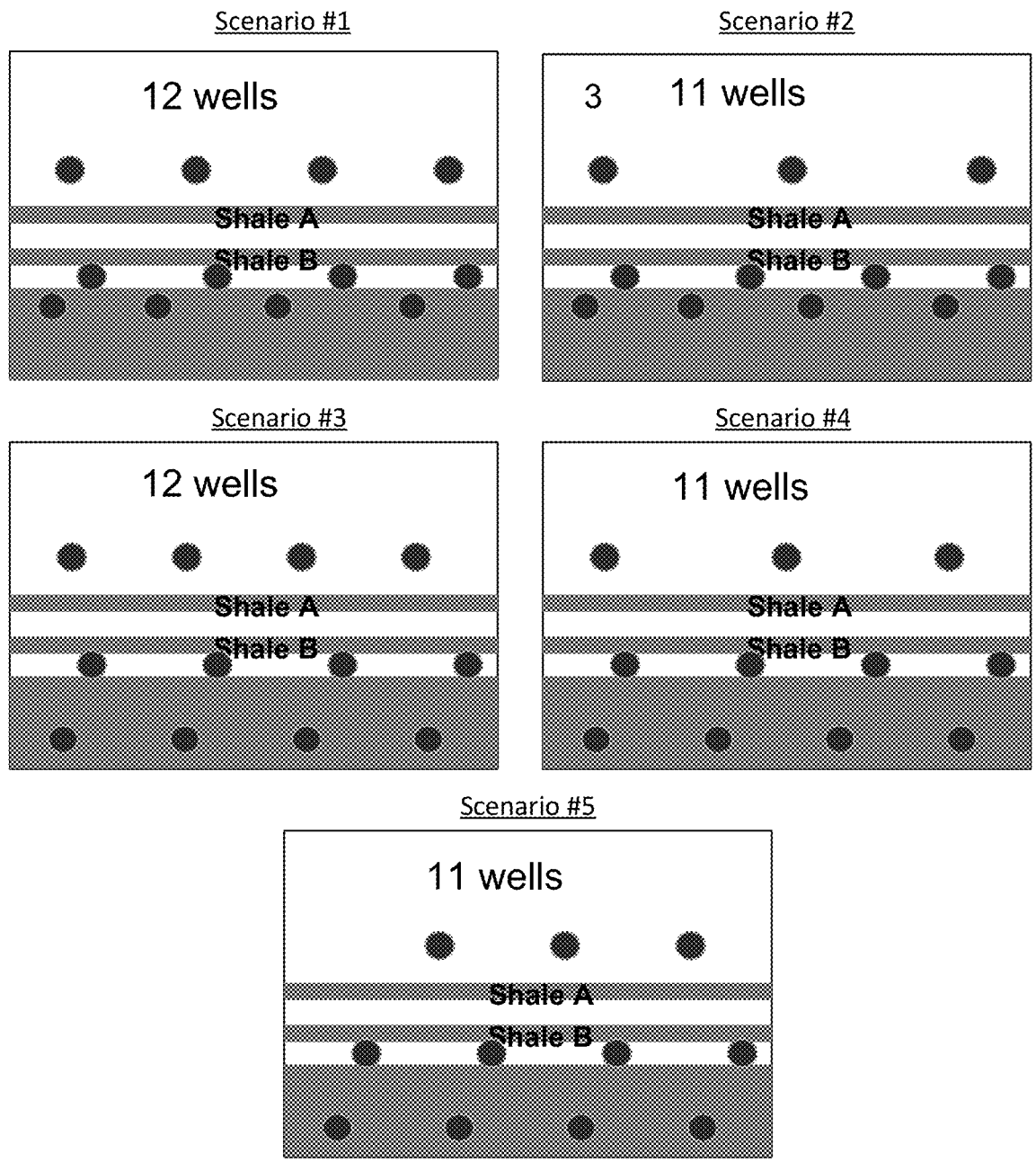
FIG. 5 illustrates example well spacing and landing designs.

FIG. 5 illustrates example well spacing and landing designs. FIG. 5 shows five different well spacing and landing designs. Two scenarios include use of twelve wells and three scenarios include use of eleven wells. The wells may be placed/spaced apart differently within different scenarios. Other well spacing and landing designs are contemplated.

Figure 6:
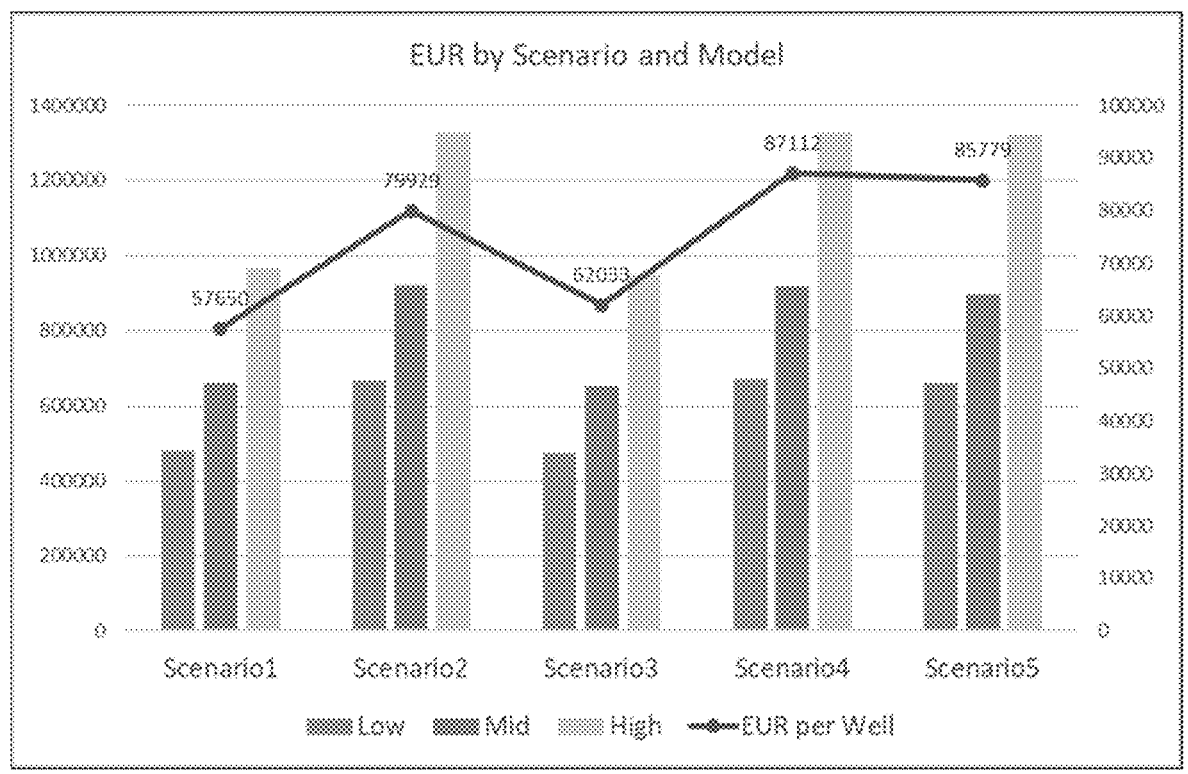
FIG. 6 illustrates example hydrocarbon recovery prediction from different well spacing and landing designs shown in FIG. 5.

FIG. 6 illustrates example hydrocarbon recovery prediction from different well spacing and landing designs shown in FIG. 5. Three different representative models (a high yield model, a medium yield model, and a low yield model) may be used to simulate hydrocarbon recovery (estimated ultimate recovery) from different well spacing and landing design scenarios shown in FIG. 5. Different bars in FIG. 6 may represent different values of hydrocarbon recovery simulated using the corresponding well spacing and landing design scenario and corresponding representative model. The line overlaid on top of the bars may represent a global objective function value per well (based on low, mid, and high EUR values). From FIG. 6, the fourth scenario (less wells with more spacing) may be selected as providing the best result. Such analysis may be used to select the scenario to be used in the real reservoir. Other factors, such as drilling constraints and/or economical index, may be considered for final scenario selection.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). A machine-readable medium may include non-transitory computer-readable medium. For example, a tangible computer-readable storage medium may include read-only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11, the electronic storage 13, and the display 14 are shown to be connected to the interface 12 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, or other wireless communication. Other types of communications are contemplated by the present disclosure.

Although the processor 11, the electronic storage 13, and the display 14 are shown in FIG. 1 as single entities, this is for illustrative purposes only. One or more of the components of the system 10 may be contained within a single device or across multiple devices. For instance, the processor 11 may comprise a plurality of processing units. These processing units may be physically located within the same device, or the processor 11 may represent processing functionality of a plurality of devices operating in coordination. The processor 11 may be separate from and/or be part of one or more components of the system 10. The processor 11 may be configured to execute one or more components by software; hardware; firmware; some combination of software, hardware, and/or firmware; and/or other mechanisms for configuring processing capabilities on the processor 11. The system 10 may be implemented in a single computing device, across multiple computing devices, in a client-server environment, in a cloud environment, and/or in other devices/configuration of devices. The system 10 may be implemented using a computer, a desktop, a laptop, a phone, a tablet, a mobile device, a server, and/or other computing devices.

It should be appreciated that although computer program components are illustrated in FIG. 1 as being co-located within a single processing unit, one or more of computer program components may be located remotely from the other computer program components. While computer program components are described as performing or being configured to perform operations, computer program components may comprise instructions which may program processor 11 and/or system 10 to perform the operation.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented.

The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system 10 and/or as removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

Figure 2:
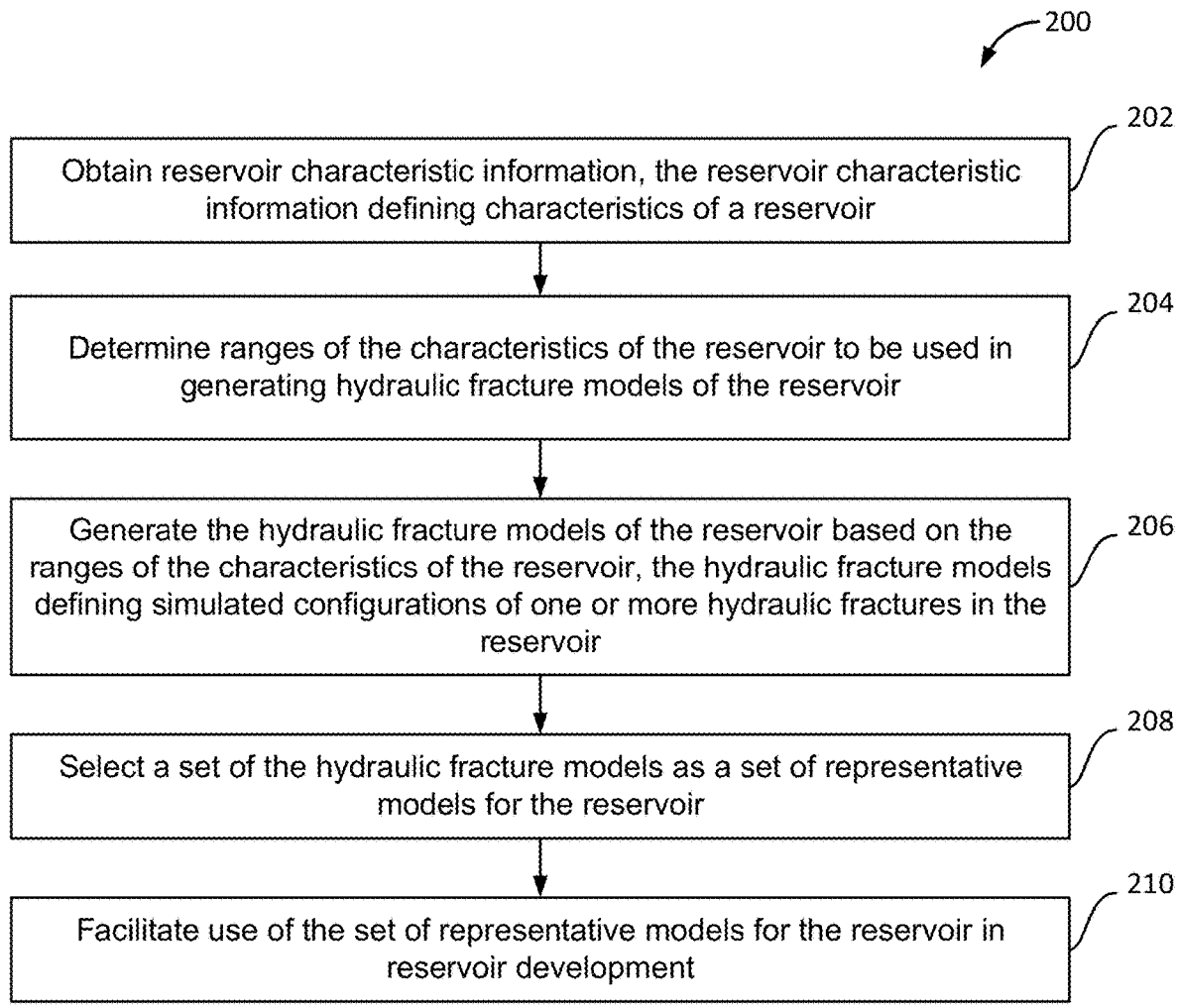
FIG. 2 illustrates an example method for selecting simulation models.

FIG. 2 illustrates method 200 for selecting simulation models. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operations of method 200 in response to instructions stored electronically on one or more electronic storage media. The one or more processing devices may include one or more devices configured through hardware, firmware, and/or software to be specifically designed for execution of one or more of the operations of method 200.

Referring to FIG. 2 and method 200, at operation 202, reservoir characteristic information and/or other information may be obtained. The reservoir characteristic information may define characteristics of a reservoir. In some implementations, operation 202 may be performed by a processor component the same as or similar to the reservoir component 102 (Shown in FIG. 1 and described herein).

At operation 204, ranges of the characteristics of the reservoir to be used in generating hydraulic fracture models of the reservoir may be determined. In some implementations, operation 204 may be performed by a processor component the same as or similar to the range component 104 (Shown in FIG. 1 and described herein).

At operation 206, the hydraulic fracture models of the reservoir may be generated based on the ranges of the characteristics of the reservoir and/or other information. The hydraulic fracture models may define simulated configurations of one or more hydraulic fractures in the reservoir. In some implementations, operation 206 may be performed by a processor component the same as or similar to the model component 106 (Shown in FIG. 1 and described herein).

At operation 208, a set of the hydraulic fracture models may be selected as a set of representative models for the reservoir. In some implementations, operation 208 may be performed by a processor component the same as or similar to the selection component 108 (Shown in FIG. 1 and described herein).

At operation 210, use of the set of representative models for the reservoir in reservoir development may be facilitated. In some implementations, operation 210 may be performed by a processor component the same as or similar to the reservoir development component 110 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for selecting simulation models, the system comprising:
one or more physical processors configured by machine-readable instructions to:
obtain reservoir characteristic information, the reservoir characteristic information defining characteristics of a reservoir;
determine ranges of the characteristics of the reservoir to be used in generating hydraulic fracture models of the reservoir;
generate the hydraulic fracture models of the reservoir based on the ranges of the characteristics of the reservoir, the hydraulic fracture models defining different simulated configurations of one or more hydraulic fractures in the reservoir based on variances in the characteristics of the reservoir used to generate the hydraulic fracture models, the different simulated configurations of the one or more hydraulic fractures in the reservoir corresponding to different amounts of hydrocarbon recovery from the reservoir, wherein different ones of the hydraulic fracture models provide different scenarios of hydraulic fractures in the reservoir;
select a set of the hydraulic fracture models as a set of representative models for the reservoir based on the different amounts of hydrocarbon recovery corresponding to the different simulated configurations of the one or more hydraulic fractures in the hydraulic fracture models; and
facilitate use of the set of representative models for the reservoir in reservoir development.

2. The system of claim 1, wherein the reservoir characteristic information is obtained based on significance of individual characteristics of the reservoir on generation of the hydraulic fracture models.

3. The system of claim 1, wherein generation of the hydraulic fracture models of the reservoir based on the ranges of the characteristics of the reservoir includes generation of the hydraulic fracture models of the reservoir based on combinations of different values of the characteristics of the reservoir, the different values of the characteristics of the reservoir falling within the ranges of the characteristics of the reservoir.

4. The system of claim 1, wherein the set of representative models for the reservoir is selected based on the different amounts of hydrocarbon recovery corresponding to the different simulated configurations of the one or more hydraulic fractures in the hydraulic fracture models to include a high yield model, a medium yield model, and a low yield model, the high yield model including a first hydraulic fracture model with a first simulated configuration of the one or more hydraulic fractures in the reservoir that corresponds to a high hydrocarbon recovery, a second hydraulic fracture model with a second simulated configuration of the one or more hydraulic fractures in the reservoir that corresponds to a middle hydrocarbon recovery, and a third hydraulic fracture model with a third simulated configuration of the one or more hydraulic fractures in the reservoir that corresponds to a low hydrocarbon recovery.

5. The system of claim 4, wherein the high yield model includes a P90 model corresponding to a 90th percentile hydrocarbon recovery, the medium yield model includes a P50 model corresponding to a 50th percentile hydrocarbon recovery, and a low yield model includes a P10 model corresponding to a 10th percentile hydrocarbon recovery.

6. The system of claim 1, wherein the hydraulic fracture models include a first hydraulic fracture model that simulates a first simulated configuration of the one or more hydraulic fractures in the reservoir and a second hydraulic fracture model that simulates a second simulated configuration of the one or more hydraulic fractures in the reservoir, the first simulated configuration of the one or more hydraulic fractures in the reservoir corresponding to a first amount of hydrocarbon recovery from the reservoir and the second simulated configuration of the one or more hydraulic fractures in the reservoir corresponding to a second amount of hydrocarbon recovery from the reservoir.

7. The system of claim 1, wherein the simulated configurations of the one or more hydraulic fractures include fracture length, fracture height, fracture volume, fracture surface area, or fracture conductivity.

8. The system of claim 1, wherein the reservoir development includes determination of number and placement of wells in the reservoir.

9. The system of claim 1, wherein the reservoir development includes determination of one or more well designs for one or more wells in the reservoir.

10. The system of claim 1, wherein the reservoir development includes estimation of hydrocarbon recovery from the reservoir.

11. A method for selecting simulation models, the method comprising:
  obtaining reservoir characteristic information, the reservoir characteristic information defining characteristics of a reservoir;
  determining ranges of the characteristics of the reservoir to be used in generating hydraulic fracture models of the reservoir;
  generating the hydraulic fracture models of the reservoir based on the ranges of the characteristics of the reservoir, the hydraulic fracture models defining different simulated configurations of one or more hydraulic fractures in the reservoir based on variances in the characteristics of the reservoir used to generate the hydraulic fracture models, the different simulated configurations of the one or more hydraulic fractures in the reservoir corresponding to different amounts of hydrocarbon recovery from the reservoir, wherein different ones of the hydraulic fracture models provide different scenarios of hydraulic fractures in the reservoir;
  selecting a set of the hydraulic fracture models as a set of representative models for the reservoir based on the different amounts of hydrocarbon recovery corresponding to the different simulated configurations of the one or more hydraulic fractures in the hydraulic fracture models; and
  facilitating use of the set of representative models for the reservoir in reservoir development.

12. The method of claim 11, wherein the reservoir characteristic information is obtained based on significance of individual characteristics of the reservoir on generation of the hydraulic fracture models.

13. The method of claim 11, wherein generating the hydraulic fracture models of the reservoir based on the ranges of the characteristics of the reservoir includes generating the hydraulic fracture models of the reservoir based on combinations of different values of the characteristics of the reservoir, the different values of the characteristics of the reservoir falling within the ranges of the characteristics of the reservoir.

14. The method of claim 11, wherein the set of representative models for the reservoir is selected based on the different amounts of hydrocarbon recovery corresponding to the different simulated configurations of the one or more hydraulic fractures in the hydraulic fracture models to include a high yield model, a medium yield model, and a low yield model, the high yield model including a first hydraulic fracture model with a first simulated configuration of the one or more hydraulic fractures in the reservoir that corresponds to a high hydrocarbon recovery, a second hydraulic fracture model with a second simulated configuration of the one or more hydraulic fractures in the reservoir that corresponds to a middle hydrocarbon recovery, and a third hydraulic fracture model with a third simulated configuration of the one or more hydraulic fractures in the reservoir that corresponds to a low hydrocarbon recovery.

15. The method of claim 14, wherein the high yield model includes a P90 model corresponding to a 90th percentile hydrocarbon recovery, the medium yield model includes a P50 model corresponding to a 50th percentile hydrocarbon recovery, and a low yield model includes a P10 model corresponding to a 10th percentile hydrocarbon recovery.

16. The method of claim 11, wherein the hydraulic fracture models include a first hydraulic fracture model that simulates a first simulated configuration of the one or more hydraulic fractures in the reservoir and a second hydraulic fracture model that simulates a second simulated configuration of the one or more hydraulic fractures in the reservoir, the first simulated configuration of the one or more hydraulic fractures in the reservoir corresponding to a first amount of hydrocarbon recovery from the reservoir and the second simulated configuration of the one or more hydraulic fractures in the reservoir corresponding to a second amount of hydrocarbon recovery from the reservoir.

17. The method of claim 11, wherein the simulated configurations of the one or more hydraulic fractures include fracture length, fracture height, fracture volume, fracture surface area, or fracture conductivity.

18. The method of claim 11, wherein the reservoir development includes determination of number and placement of wells in the reservoir.

19. The method of claim 11, wherein the reservoir development includes determination of one or more well designs for one or more wells in the reservoir.

20. The method of claim 11, wherein the reservoir development includes estimation of hydrocarbon recovery from the reservoir.

* * * * *